United States Patent [19]

Cohn et al.

[11] Patent Number: 5,185,306
[45] Date of Patent: Feb. 9, 1993

[54] PREVENTION OF NOBLE METAL MIGRATION IN BOUND ZEOLITES DURING THERMAL OXIDATION

[75] Inventors: Michelle J. Cohn, Mt. Prospect; R. Joe Lawson, Palatine; Mark D. Moser, Elk Grove Village, all of Ill.

[73] Assignee: UOP, Des Plaines, Ill.

[21] Appl. No.: 735,213

[22] Filed: Jul. 24, 1991

[51] Int. Cl.⁵ .......................... B01J 29/04; B01J 37/00
[52] U.S. Cl. ......................................... 502/66; 502/74
[58] Field of Search ............................. 502/66, 74, 85

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,595,669 | 6/1986 | Fung et al. | 502/66 |
| 4,657,874 | 4/1987 | Borghard et al. | 502/66 |
| 4,789,655 | 12/1988 | Travers et al. | 502/66 |
| 4,810,683 | 3/1989 | Cohn et al. | 502/37 |

*Primary Examiner*—Carl F. Dees
*Attorney, Agent, or Firm*—Thomas K. McBride; Eugene I. Snyder

[57] ABSTRACT

Metal migration from molecular sieve particles to binder particles in agglomerates of molecular sieves bearing group VIII zerovalent metal occurs readily at temperatures above 350° C. Such migration can seriously impair the performance of the catalyst whose effectiveness depends on the presence of the metal largely, if not exclusively, on the molecular sieve particle. Exposure of the catalyst, or a catalyst precursor, to temperatures facilitating group VIII metal migration can occur at various periods during the catalyst's history. Group VIII metal migration can be inhibited and often effectively prevented when chlorine or a chlorine-containing compound is present in the non-reducing atmosphere at temperatures which otherwise would bring about metal migration.

9 Claims, No Drawings

PREVENTION OF NOBLE METAL MIGRATION IN BOUND ZEOLITES DURING THERMAL OXIDATION

BACKGROUND OF THE INVENTION

Catalytic composites containing molecular sieves are well known in the art and are commonly used in the conversion of a wide variety of hydrocarbons. Recently, L-zeolites in combination with other catalytic components have been discovered to be an effective catalyst for converting light paraffinic hydrocarbons into $C_6$-plus aromatics (light paraffin conversion, or LPC process). The $C_6$-plus aromatics produced in such a conversion process are valuable as they have a higher octane rating than the feedstock and are useful gasoline blending components. Additionally, the aromatics can be recovered from the product for further processing.

It was observed in U.S. Pat. No. 4,810,683 that clustering of a group VIII noble metal deposited on a non-acidic zeolite used as a catalyst occurs during the carbon burn of a catalyst which has become deactivated through carbonaceous deposits on the catalyst. Since such clustering seriously impaired the performance of the regenerated catalyst (i.e., the carbonaceous deposit-free catalyst), it was imperative to avoid clustering during catalyst regeneration. Avoidance of the high temperature oxidation was not possible since this is the most effective means to remove carbon deposits. However, quite surprisingly it was found that the presence of halogen or halogen-containing compounds in the oxidizing stream prevented such clustering. This permitted the regeneration of catalysts with performance characteristics approaching that of the initial catalysts.

It soon became apparent that other heretofore unrecognized factors also are important in determining the performance characteristics of regenerated catalysts, for the prevention of clustering per se did not necessarily ensure good performance as a regenerated catalyst. Thus, even when regeneration was performed as described in U.S. Pat. No. 4,810,683 the performance of the regenerated catalyst was not necessarily acceptable even though no clustering of the group VIII metal had occurred. Such observations led to the realization that clustering is not the sole factor degrading catalyst performance. Continued work soon afforded the understanding that processes occurring in preparing the finished catalyst played an important role in catalyst performance.

Molecular sieves generally are not used per se in a finished catalyst, especially when the molecular sieve material serves as a support for a metal, but are instead dispersed in a binder. For most industrial applications the discrete particles of molecular sieve materials are too small to be used directly, and so are agglomerated into the larger particles which may be more efficaciously used. These agglomerates are formed by mixing small particles of molecular sieves with a binding agent (binder) where alumina and silica are examples of commonly used binders. The agglomerates consist of a multiplicity of small particles dispersed in a binder and often contain adjuncts such as plasticizers, burnout agents, and extrusion agents, for example. Thus, a finished catalyst of the type under consideration in this application has small zeolitic particles, dispersed in a binder, serving as a support for one or more group VIII metals, generally in a zerovalent state. It is important to note that in a catalyst, at least as first prepared, it is possible to have all of the metals on the molecular sieve surface and none of the metals dispersed in the binder. However, group VIII metals generally are more weakly bound by the molecular sieve than by materials used as binders, and especially by alumina used as a binder. What we have discovered is that even at temperatures as low as 350° C. the metal tends to migrate from the molecular sieve to the binder. Even though the metal may not agglomerate in the binder, the catalytic performance of the composite may be seriously degraded simply because the binder-supported metal may be vastly inferior to the zeolite-supported metal as a catalyst in the process of interest.

What we have found in a catalytic composite of a molecular sieve supporting the metal where the molecular sieve particles are dispersed in a binder is that metal migration from the molecular sieve to the binder at temperatures above 350° C. and up to about 650° C. does not occur, or at least is greatly reduced and inhibited, in the presence of chlorine, hydrogen chloride or a chlorine-containing compound which is a precursor of either of them. Stated somewhat differently, our invention inhibits or even prevents metal migration from molecular sieve particles to the binder in a molecular sieve agglomerate during heating at temperatures of 350° C. and higher, up to about 650° C., in a non-reducing atmosphere by adding chlorine, hydrogen chloride or a chlorine-containing precursor of either of them to the non-reducing atmosphere. Although this invention is clearly related to our earlier one in U.S. Pat. No. 4,810,683 which was directed to regeneration of a catalyst deactivated by deposition of carbonaceous materials by conducting a carbon burn with an oxygen stream containing a halogen or halogen-containing compound in the temperature interval of 300°–600° C., the instant invention is also clearly distinct from that described above in several important aspects. Perhaps most importantly, the invention herein is not limited to catalyst regeneration, and some of its most critical aspects are in fact related to catalyst preparation. Equally important, the invention here is not limited to catalysts having carbonaceous deposits, and in facts some of the applications of paramount importance occur in cases where the catalyst is devoid of carbon deposits.

SUMMARY OF THE INVENTION

The purpose of this invention is to prevent, or at least to inhibit, the migration of noble metals from molecular sieve particles to binder particles in an agglomerate containing molecular sieve and binder particles when the agglomerate is heated to a temperature of 350° C. or more in a non-reducing atmosphere. An embodiment comprises heating a molecular sieve agglomerate, free from carbonaceous deposits and bearing at least one group VIII zerovalent metal, at a temperature of 350° C. to about 650° C. in a non-reducing atmosphere containing chlorine, hydrogen chloride, or a chlorine-containing compound which is a precursor of either of them. In a more specific embodiment the metal is platinum. In another specific embodiment the chlorine-containing component is present at a concentration of at least 0.05 mole percent. In a still more specific embodiment hydrogen chloride is the chlorine-containing component and is present at a concentration from about 0.1 to about 1.0 mole percent. Other embodiments will become apparent from the ensuing description.

DETAILED DESCRIPTION OF THE INVENTION

Our invention is based on the observation that group VIII metals generally, and platinum particularly, are mobile in molecular sieve agglomerates where the metal initially is on the molecular sieve particle. The effects of metal mobility are most readily apparent at temperatures of 350° C. and above, especially in a non-reducing atmosphere, with the result that the binder becomes enriched in metal and the molecular sieve becomes depleted in the metal, but this result is not necessarily accompanied by clustering of the metal. Since catalyst performance is often sensitive to the metal support, that is, whether the metal is on a molecular sieve or the metal is on, for example, alumina as the binder, the performance of the catalyst in which substantial metal migration to the binder has occurred frequently is quite different from, and usually is inferior to, the catalyst in which such migration has not occurred.

The catalysts of interest in this invention are exposed to high temperatures at different times. Catalysts having carbonaceous deposits are regenerated via oxidation at temperatures from 300°–600° C., and the use of halogen to prevent clustering (which is a kind of migration) has been described. However, we also have observed substantial metal migration during cooling of carbonaceous deposit-free materials subsequent to regeneration, cooling which typically is done in the absence of a halogen or halogen-containing compound and which does not lead to clustering but which nonetheless is accompanied by metal migration leading to concentration of the metal in the binder. Substantial metal migration also is observed during calcination of the catalytic composite; that is, in the preparation of, for example, a catalyst having platinum deposited on a molecular sieve as the tetraamine complex where the platinum is converted by calcination to platinum oxide. Thus it is seen even in catalyst preparation that it is possible to unintentionally deplete the molecular sieve surface of a group VIII metal and thereby prepare an inferior catalyst.

As heretofore indicated, it is an essential feature of the catalysts used in a LPC process that it comprises a nonacidic molecular sieve. By "nonacidic molecular sieve", it is meant that the molecular sieve has substantially all of its cationic sites of exchange occupied by nonhydrogen cationic species. Preferably, such cationic species will comprises alkali metal cations although other cationic species may be present. Irrespective of the actual cationic species present in the sites of exchange, the nonacidic molecular sieve in the present invention has substantially all of the cationic sites occupied by nonhydrogen cations, thereby rendering the molecular sieve substantially fully cationic exchanged. Many means are well known in the art for arriving at a substantially fully cationic exchanged molecular sieve and thus they need not be elaborated herein. The nonacidic molecular sieve of the present invention acts to modify the catalytic group VIII metal and is substantially inert in the reaction.

Although catalysts effective in the LPC process are of primary importance to us in the context of preventing or inhibiting noble metal migration from the zeolite or molecular sieve particles to the binder, it needs to be recognized that our invention is effective for molecular sieves generally. Thus, the emphasis on non-acidic molecular sieves merely reflects our particular interest in catalysts for the LPC process and does not reflect any inherent limitation of our method to nonacidic molecular sieves.

The molecular sieves which may be used in the practice of this invention may be any crystalline inorganic molecular sieve such as aluminosilicates, aluminophosphates, silica-aluminophosphates, borosilicates, silicates, and silicalite. Representative of such molecular sieves are the aluminophosphates of U.S. Pat. No. 4,310,440, the silica-aluminophosphates of U.S. Pat. No. 4,440,871, transition metal-containing silica-aluminophosphates (MeAPSO's), zeolite X, zeolite Y, LZ-210, zeolite A, zeolite F, zeolite l, zeolite p, zeolite Q, zeolite W, clinoptilolite, mordenite, chabazite, errionite, ZSM-type zeolites, NU-type zeolites, faujasite, phillipsite, and so forth. It is to be clearly understood that the foregoing is not an exhaustive list of molecular sieves which can be used in the practice of this invention, but the members are merely illustrative and representative of this class of materials. The catalytic composite of the present invention may also comprise a mixture of different molecular sieves. Of course, each of the molecular sieves employed in the invention must be in nonacidic form as defined above for use in a LPC process and, therefore, the cationic exchangeable sites are substantially fully cationic exchanged with nonhydrogen cationic species. As also indicated above, typically the cations occupying the cationic exchangeable sites will preferably comprise one or more of the alkali metals including lithium, sodium, potassium, rubidium, and cesium. Accordingly then, the nonacidic molecular sieve of the present invention may comprise the sodium forms of X-zeolite, Y-zeolite, or mordenite. An especially preferred nonacidic molecular sieve for application in the present invention is the potassium form of L-zeolite. It should also be understood, however, that the nonacidic molecular sieve of the invention may contain more than one type of the alkali metal cation at the cationic exchangeable sites, for example, sodium and potassium.

Typically the molecular sieve particles are less than about 20 microns in diameter, and the small size often precludes their direct use in commercial processes. For example, when used as a packed bed such a small particle size would lead to far larger pressure drops than could be economically accommodated. Consequently the small particles are dispersed in an inorganic matrix acting as a binder which forms agglomerates consisting of a multitude of small particles of molecular sieves. The molecular sieve typically will be present in the inorganic matrix in such portions that the resulting product contains from 1 to 95 weight percent of the molecular sieve, although more normally the agglomerate contains between about 10 and about 90 weight percent of molecular sieve in the final product. The binders which are of interest in this invention are inorganic oxides such as silicas, silica-aluminas, aluminas, titania, silica-zirconia, silica-magnesia, alumina-boria, alumina-titania, clays such as kaolin, and mixtures thereof. The usual purpose of the binder is to aid in forming or agglomerating the small particles of the molecular sieve into larger, commercially more useful ones. The mixture of molecular sieves and binder is then formed into particles of suitable size and shape and subsequently calcined to "set" the particles. It should be mentioned that the inorganic oxides when used as binders also may contain other materials as additives, such as plasticizers, extrusion acids, and burnout agents. A preferred binder comprises silica, and an especially preferred binder comprises alumina. It is further preferred that the support matrix be substantially inert to the reactants to be converted by the composite as well as the other constituents of the composite. To this end, it is preferred that in a LPC process the support matrix be nonacidic to avoid promotion of undesirable side-reactions. Such nonacidity may be induced by the presence of alkali metals.

The molecular sieve may be dispersed in an organic matrix by any method known in the art. Such methods include pilling, extruding, granulating, marumarizing, etc. Particularly preferred methods are the so-called oil-drop method, or extrusion.

Typically, in binding a molecular sieve in an inorganic matrix by means of the oil-drop method, powdered molecular sieve is admixed with a sol comprising the desired inorganic matrix or precursors thereof, and a gelling agent. Droplets of the resulting admixture are dispersed as spherical droplets in a suspending medium, typically oil. The gelling agent thereafter begins to cause gelation of the sol as a result of the change in the sol pH. The resulting gelled inorganic matrix is an agglomerate which has bound and dispersed therein the molecular sieve. The suspending medium helps maintain the spherical shape of the droplets. Usable suspending mediums include Nujol, kerosene, selected fractions of gas oil, etc. Many gelling agents are known in the art and include both acids and bases. Hexamethylenetetramine is only one such known gelling agent. The hexamethylenetetramine slowly decomposes to ammonia upon heating. This results in a gradual pH change and as a result a gradual gelation.

An extrudate is another form of catalyst agglomerate useful in the catalysts of interest in the instant invention. In general the extrusion method of preparing a catalyst composite comprises combining a powdered form of the desired molecular sieve with a powdered inorganic matrix or binder such as one selected from the group mentioned above. The powders are combined with a liquid peptizing agent to transform the powder into a dough. The choice of peptizing agent will vary depending upon the binder chosen. The peptizing agent can be an acid such as nitric acid, acetic acid, citric acid, or the like. The peptizing agent may also be a base such as a hydroxide or ammonia. The dough produced by adding the peptizing agent is then extruded through an appropriately sized die plate to produce cylindrical particles. The extrudate is then dried and calcined at conditions known in the art followed by deposition of catalytic components such as a group VII metal component upon the catalyst by means known in the art.

Regardless of the exact method of binding the molecular sieve to form agglomerates, sufficient molecular sieve may be used to result in a catalytic composite comprising from about 20 to about 80 wt. % molecular sieve based on the weight of the agglomerate, i.e., molecular sieve and support matrix. The exact amount of molecular sieve advantageously included in the catalytic composite of the invention will be a function of the specific molecular sieve, the support matrix, and the specific application of the catalytic composite. For example, a catalytic composite comprising about 50 to 75 wt. % potassium form of L-zeolite bound in alumina is preferred in the LPC process.

A further essential feature of the catalyst of the present invention is the presence of catalytically effective amounts of at least one group VIII metal component, including catalytically effective amounts of nickel, ruthenium, rhodium, osmium, palladium, iridium, platinum, or mixtures thereof. Especially preferred among the group VII metal components is platinum. The group VIII metal component may be composited with the other constituents of the catalytic composite by any suitable means known in the art. For example, a platinum component may be impregnated by means of an appropriate solution such as a dilute chloroplatinic acid solution. Alternatively, the group VIII metal component may be composited by means of ion exchange in which case some of the cationic exchange sites of the nonacidic molecular sieve may contain group VIII metal cations. It will be recognized that in this variant the metal perforce is selectively associated with the molecular sieve. After ion exchange, the group VIII metal may be subject to oxidation prior to any reduction step, as is discussed more fully below. The group VIII metal component may be composited with the other constituents either prior or subsequent to the deposition of the hereinafter described optional surface-deposited alkali metal. Additionally, the group VIII metal may be composited with the molecular sieve and thereafter the molecular sieve-containing group VIII metal may be bound with the support matrix.

In addition to comprising a group VIII metal component, it is contemplated in the present invention that the catalyst thereof may contain other metal components well known to have catalyst modifying properties. Such metal components include components of rhenium, tin, cobalt, indium, gallium, lead, zinc, uranium, thallium, dysprosium, and germanium, etc. Incorporation of such metal components have proven beneficial in catalytic reforming as promoters and/or extenders. Accordingly, it is within the scope of the present invention that catalytically effective amounts of such modifiers may be beneficially incorporated into the catalyst of the present invention.

Irrespective of the particular group VIII metal component or catalytic modifiers, the catalysts used in LPC generally have an optional surface-deposited alkali metal sufficient to provide a surface-deposited alkali metal index of at least 10 and preferably from about 40 to about 500. It is to be understood that by "surface-deposited alkali metal", it is meant that the alkali metal component is not associated with a cationic exchangeable site, but rather is excess alkali metal component above that amount required to occupy substantially all of the cationic exchangeable sites. It is to be further understood that the surface-deposited alkali metal index is indicative of the amount of such surface-deposited alkali metal. As used herein, the term "surface-deposited alkali metal index" is defined as $10^4$ multiplied by the moles per liter of soluble alkali metal yielded by the weight of catalytic composite comprising 0.5 g of nonacidic molecular sieve placed in 10 cc of deionized water as measured by an electrode sensitive to said alkali metal at 25° C.

Any of the alkali metals may be used as the surface-deposited alkali metal including lithium, sodium, potassium, rubidium, cesium, and mixtures thereof. The surface-deposited alkali metal giving the best results will depend on the particular nonacidic molecular sieve used. Potassium on the potassium form of L-zeolite is especially preferred. Additionally, sodium on the sodium form of X-zeolite or Y-zeolite may also be advantageously employed.

The surface-deposited alkali metal may be composited with the catalyst by any suitable technique. Standard impregnation techniques may be employed utilizing an aqueous solution of an alkali metal salt using either basic or neutral salts. For example, when surface-depositing potassium on a catalyst comprising the potassium form of L-zeolite, the impregnation solution may comprise a basic salt of potassium such as KHCO$_3$, K$_2$CO$_3$, KOH, etc. Alternatively, a solution comprising neutral potassium salt such as KCl may be used.

As previously alluded to, the catalyst composite- or more properly its precursor-is subjected to temperatures which effect metal migration during oxidation or calcination of the metal-impregnated agglomerate in a non-reducing atmosphere. Oxidation conditions generally embrace temperatures from about 300° to about 600° C. and is performed in air to bring about conversion of the metal to its oxide. For example, although impregnation of platinum is most favorably carried out with its tetraammine complex, reduction of the latter to zerovalent platinum is difficult, hence the platinum tetraamine salt first is converted to platinum oxide, usually during oxidation. It is at this stage that metal migration may occur, and it is at precisely this stage where our invention may be advantageously practiced.

What we have found is that the presence of either chlorine, hydrogen chloride, or a precursor of either of them effectively prevents, or at least inhibits, migration of a group VIII metal between the binder and molecular sieve particles. In an oxidizing atmosphere there is an equilibrium between chlorine and hydrogen chloride,

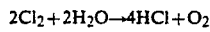

$$2Cl_2 + 2H_2O \rightarrow 4HCl + O_2$$

Additionally, many materials, notably alkyl chlorides, act as precursors to hydrogen chloride under the oxidizing conditions employed. That is, alkyl chlorides decompose to hydrogen chloride and, presumably, alkenes at oxidation conditions to be effective anti-migration agents. Accordingly, it can be appreciated that a wide variety of chlorine-containing compounds may be effective in preventing or inhibiting metal migration in the catalysts under discussion.

Whether one uses chlorine, hydrogen chloride, or a precursor of either of them is a matter of choice which does not constitute an essential part of this invention, although the use of an aqueous solution of hydrogen chloride injected into the gas stream is a preferred mode of operation. Thus, although it is true that chlorine is a more effective anti-migration agent this is a consequence of a kinetic effect which can be offset, or compensated for, by a higher concentration of a less effective chloride, such as hydrogen chloride or an alkyl chloride. Although concentrations of chlorine or chlorine-containing material may be effective in the non-reducing atmosphere at a level as low as about 0.005 mole percent it is more common to use a level of about 0.05 mole percent or greater. The range of 0.1 to about 1.0 mole percent is the most preferred one in the practice of this invention, but higher concentrations, such as 5 mole percent, can be used although no substantial incremental benefits should be expected.

As previously indicated, the catalysts of the instant invention become deactivated at least partially as a result of carbon accumulation on the catalyst due to contacting the catalyst with a hydrocarbon at hydrocarbon conversion conditions. The catalyst of the present invention may become deactivated through use in a wide variety of hydrocarbon conversion conditions, which themselves are not of paramount importance to this invention but which have been more fully described in U.S. Pat. No. 4,810,683. As described there, these carbonaceous deposits are removed via combustion by treatment of the deactivated catalyst with an oxygen-containing gas stream having a halogen or a halogen-containing compound to prevent metal clustering. Combustion is carried out at temperatures in the range from 350° to 600° C., after which the carbonaceous deposit-free material is thereafter typically purged with nitrogen or another inert gas to displace oxygen and water and to cool the material prior to its reductions with hydrogen.

As might be expected from our foregoing comments, but quite surprisingly in view of the prior art, we have found that substantial metal migration can occur during this cool-down period which previously was conducted in the absence of chlorine or a chlorine-containing compound. Thus, although the prior art regeneration method prevented metal clustering during combustion of the carbonaceous deposits on the catalyst it failed to prevent subsequent migration of the metal during cool-down, a migration which is unaccompanied by clustering. Our contribution is both the recognition of such migration as well as the recognition that such migration can be inhibited or completely prevented if the cool-down is performed in the presence of chlorine, hydrogen chloride, or a chlorine-containing compound which is a precursor to either of them. The kinds of chlorine-containing compounds which are effective in the practice of this invention as well as the concentrations within which they are effective have been described above and will not be repeated here.

As previously noted, another period during which our invention may be advantageously practiced is oxidation of the catalyst precursor, a process in which the noble metal oxide is produced from another form of the metal. Oxidation typically is performed at a temperature greater than 350° C. in an oxidizing atmosphere, and as shown below this can lead to serious impairment of the performance of the catalyst subsequently resulting from reduction of the noble metal oxide to the zerovalent metal. However, when oxidation is performed in the presence of chlorine, hydrogen chloride, or a chlorine-containing precursor to either of them catalyst performance is maintained, because of the inhibition of metal migration during oxidation.

The following examples are given to illustrate further the method of the present invention and to indicate the benefits which are realized through the utilization thereof. It is understood that the examples are given for the sole purpose of illustration.

EXAMPLE 1

Platinum migration during calcination. A catalyst of platinum on L-zeolite with alumina as the binder was prepared in the following way. Toyosoda L-zeolite (SZ-500-KOA) was blended 50:50 with catapal alumina as binder and peptized with potassium hydroxide. The blend was continuously extruded with a powder addition rate of 80 grams per minute (powder blend LOI [loss on ignition] 20.1 weight percent at 900° C.) and a potassium hydroxide addition rate of 0.779 grams potassium hydroxide per minute and a water addition rate of 33.7 grams per minute. The desired peptizing agent-:binder was 0.025 grams peptizer per gram of binder, on a volatile free basis, the dough temperature was 125° F. (52° C.), and the extrudate LOI before calcining was 42.4% at 900° C. The extrudate was calcined at 750° F.

(399° C.) for 15 minutes with 10.6% moisture and at 1187° F. (642° C.) for 42 minutes with 5% moisture.

The foregoing support (600 g) was mixed with a solution of 0.777 weight percent platinum as Pt(NH$_3$)$_4$Cl$_2$ and 0.47 weight percent potassium as potassium chloride (molar ratio of potassium to platinum of 3:1). The volume of solution was 0.90 times the volume of support used. The mixture was then rolled in a glass-jacketed evaporator heated with steam for 6 hours to afford a product with an LOI of about 20% at 900° C.

The platinum impregnated material then was oxidized in air at a gas hourly space velocity (GHSV) of 540 hr$^{-1}$. The temperature was ramped from ambient to 350° C. at 83° C./hr., and the material was oxidized at this temperature for 2 hours. The resulting composite containing platinum oxide on the molecular sieve was reduced in hydrogen at 450 hr$^{-1}$ GHSV with a temperature ramped from ambient to 350° C. at 56° C. per hour and the temperture was thereafter held at 350° C. for 1.5 hours.

Sample A was a fresh catalyst oxidized in air for 1 hour at 500° C. and then reduced in hydrogen for 1.5 hours at 500° C. Sample B was a fifth regeneration catalyst in which hydrogen chloride and chlorine were present during the carbon burn. This catalyst had an activity close to that of the initial catalyst but with poor stability.

Both catalysts were ground with a mortar and pestle to a fine powder. A carbon coated copper grid prewet with isopropanol was dipped into the powder and allowed to dry before placing it into the Scanning Transmission Electron Microscope (STEM) for analysis. The results are summarized in the following table.

TABLE 1

| Particle # | Weight Percent | | | | |
|---|---|---|---|---|---|
| | Al | Si | Cl | K | Pt |
| SAMPLE A | | | | | |
| 1 | 97.5 | 0.7 | 0 | 0.6 | 1.2 |
| 2 | 92.6 | 3.7 | 0.7 | 1.9 | 1.2 |
| 3 | 94.8 | 2.3 | 0.7 | 0.7 | 1.5 |
| 4 | 94.2 | 2.0 | 1.1 | 1.2 | 1.5 |
| 5 | 94.8 | 1.8 | 0.8 | 1.2 | 1.4 |
| 6 | 93.7 | 2.2 | 0.9 | 1.4 | 1.8 |
| 7 | 94.8 | 2.4 | 0.7 | 0.9 | 1.2 |
| 8 | 97.7 | 1.6 | 0.1 | 0.2 | 0.4 |
| 9 | 95.5 | 2.1 | 0.3 | 0.8 | 1.3 |
| 10 | 95.9 | 2.4 | 0.1 | 0.7 | 0.9 |
| 11 | 95.6 | 2.3 | 0.1 | 0.7 | 1.4 |
| AVE. | 95.2 ± 1.5 | 2.1 ± 0.7 | 0.5 ± 0.4 | 0.9 ± 0.5 | 1.3 ± 0.4 |
| 12 | 38.1 | 58.4 | 0.4 | 1.9 | 1.1 |
| 13 | 38.0 | 59.7 | 0.3 | 0.8 | 1.2 |
| 14 | 39.7 | 54.4 | 0.6 | 3.3 | 2.1 |
| 15 | 35.0 | 62.2 | 0.4 | 1.1 | 1.2 |
| 16 | 34.8 | 62.4 | 0.3 | 1.1 | 1.4 |
| 17 | 30.4 | 67.5 | 0.3 | 0.9 | 1.0 |
| 18 | 36.3 | 59.5 | 0.5 | 1.8 | 1.9 |
| 19 | 34.2 | 62.3 | 0.3 | 1.5 | 1.7 |
| 20 | 28.7 | 67.5 | 0.5 | 1.8 | 1.5 |
| AVE | 35.0 ± 3.6 | 61.5 ± 4.2 | 0.4 ± 0.1 | 1.6 ± 0.8 | 1.5 ± 0.4 |
| SAMPLE B | | | | | |
| 21 | 89.8 | 9.3 | 0 | 0.9 | 0 |
| 22 | 92.7 | 5.2 | 0.4 | 1.6 | 0 |
| 23 | 96.3 | 2.7 | 0.6 | 0.4 | 0 |
| 24 | 93.2 | 4.3 | 0.8 | 1.7 | 0 |
| 25 | 92.4 | 5.0 | 0.4 | 0.5 | 0 |
| 26 | 94.2 | 5.0 | 0.4 | 0.4 | 0 |
| 27 | 90.2 | 9.8 | 0 | 0 | 0 |
| 28 | 93.8 | 4.9 | 0.4 | 1.0 | 0 |
| AVE | 92.8 ± 2.1 | 5.4 ± 2.9 | 0.5 ± 0.4 | 1.0 ± 0.6 | 0 |
| 29 | 30.2 | 60.1 | 1.1 | 5.9 | 2.7 |
| 30 | 36.2 | 57.0 | 1.0 | 2.9 | 2.9 |
| 31 | 32.5 | 56.2 | 1.1 | 0.6 | 9.6 |
| 32 | 36.4 | 54.6 | 0.4 | 6.4 | 2.2 |
| 33 | 41.3 | 54.1 | 0.5 | 1.5 | 2.6 |
| 34 | 30.0 | 62.6 | −.9 | 3.0 | 3.5 |
| 35 | 31.7 | 63.1 | 0.6 | 0.4 | 4.2 |
| 36 | 35.9 | 56.2 | 1.1 | 2.2 | 4.7 |
| 37 | 31.7 | 57.6 | 1.2 | 2.4 | 7.1 |
| 38 | 34.3 | 57.5 | 1.3 | 3.5 | 3.3 |
| AVE | 34.0 ± 3.5 | 57.9 ± 3.0 | 0.9 ± 0.3 | 2.9 ± 2.0 | 4.3 ± 2.3 |

In both samples A and B particles were selected so as to be either predominantly binder (high aluminum to silicon ratio; particles 1–11 and 21–28) or predominantly molecular sieve (relatively lower aluminum to silicon ratio; particles 12–20 and 29–38). The results of sample A show that platinum is present in comparable concentrations in both the binder (particles 1–11) and the molecular sieve (particles 12–20). In contrast, sample B shows no platinum in the binder (particles 21–28) and all of the platinum associated with the molecular sieve (particles 29–38). This shows quite unequivocally that platinum migrates from the molecular sieve to the binder when heated to 500° in the absence of chlorine, hydrogen chloride, or a chlorine-containing precursor but that no migration occurs upon a similar treatment in the presence of chlorine and hydrogen chloride.

EXAMPLE 2

A silica-bound L-zeolite was prepared by continuous extrusion with 10% potassium hydroxide at 6.3 cc/min. using the L-zeolite of Example 1 at 45 lbs/min. and a silica binder (Hisil 250 TM) at 7.9 lbs./min. The resulting agglomerate was calcined at 750° F. (399° C.) and 1090° F. (588° C.) at 10 and 5% water respectively.

The foregoing was exchanged with a flow of an exchange solution containing 0.57 weight percent platinum as Pt(NH$_3$)$_4$Cl$_2$ and 3.2 weight percent potassium as potassium chloride using 4.12 times the volume of support. Exchange was continued for 4 hours with 0.697 g of 0.1 molar hydrogen chloride added to the solution. Exchange was followed by a 0.5 hr. wash with water at 6 LHSV after which the mixture was rolled in a glass-jacketed evaporator heated with steam for 1 hour to afford material with an LOl to 30.4.

Oxidation and reduction of the resulting material was performed analogously to that in the foregoing example. The finished catalyst was then subjected to differing oxidation treatments to determine the effect of temperature on catalyst performance.

Catalyst 2A was virgin catalyst which was oxidized in the presence of HCl as follows. Catalyst as prepared above was loaded into a furnace purged with N$_2$ for 10 minutes at 2800 hr$^{-1}$ GHSV, heated to 200° C. At 200° C., sufficient air was added to the N$_2$ to give 0.5% O$_2$. The total flow was held constant at 2800 hr$^{-1}$ GHSV. Simultaneously, 2.1M HCl was added at 9.6 cc/hr. The temperature was increased to 425° C. and maintained for ½ hour.

The N$_2$ flow was reduced and additional air was added to provide 1% O$_2$ in the gas at 2800 hr$^{-1}$ GHSV. After ½ hour at those conditions, the ½ hour was repeated at 2, 5, 10 and 21% O$_2$. After ½ hour at 21% O$_2$, the temperature was lowered to <350° C. and HCl injection was stopped. The catalyst was then held in a dry air flow for ½ hour at less than 350° C.

The foregoing was loaded into a furnace tube, and air was purged from the tube with $N_2$. Material was heated to 200° C., then gas flow was switched to 3500 cc/min dry air and 10.8 cc/hr 10M HCl. The temperature was increased to 425° C. and $Cl_2$ was injected into the air and HCl stream at rate of 40 cc/min. After 40 minutes the $Cl_2$ was cut out and the temperature was lowered to <350° C. Then the HCl injection was stopped and the catalyst was held in dry air for ½ hour.

Catalyst was prepared from the foregoing by hydrogen reduction. The material was purged with $N_2$ for 10 minutes at 1000 cc/min. Gas flow switched to $H_2$ at 3000 cc/min. The catalyst was then heated to 350° C. and held there for 1½ hours. The catalyst was then purged with $N_2$ and cooled.

Catalyst 2B was material which was oxidized at 350° C. in the absence of HCl or $Cl_2$, then reduced as above.

Upon testing the foregoing catalysts in liquid paraffin conversion under conditions described in Example 3 in greater detail, Catalyst 2A performed substantially better than to Catalyst 2B. Data are given in Table 2.

TABLE 2

High Temperature Oxidation in Presence and Absence of HCl - Effects on LPC Catalytic Activity

| Hours | % Conversion | |
|---|---|---|
| | Sample 2A | Sample 2B |
| 10 | 77.0 | |
| 15 | | 58 |
| 20 | 72.0 | 57 |
| 25 | 71.8 | 55.5 |
| 30 | | 54.5 |
| 35 | 72.2 | 52.5 |
| 40 | | 52.0 |
| 45 | 69.8 | 51.5 |
| 50 | 67.8 | 51.0 |
| 55 | | 51.3 |
| 60 | 66.1 | 50.5 |
| 65 | 65.9 | 50 |
| 70 | | 50.1 |
| 75 | 67.8 | |
| 80 | 68.0 | 50.0 |
| 85 | 64.3 | 50.0 |
| 90 | 68.0 | 48.2 |
| 95 | 71.0 | 48.0 |
| 100 | 69.9 | 48.2 |
| 105 | 68.3 | 48.4 |
| 110 | 69.0 | 48.0 |
| 115 | 69.8 | 47.8 |
| 120 | 70.0 | 41.8 |
| 125 | 71.0 | 46.0 |
| 130 | 70.4 | 49.5 |
| 135 | 68.7 | 43.8 |
| 140 | 70.1 | 44.2 |
| 145 | 71.8 | 45.0 |
| 150 | 72.0 | 44.0 |
| 160 | | 44.1 |
| 165 | | 44.0 |
| 170 | | 43.8 |

EXAMPLE 3

Comparison of HCl-treated and untreated catalysts in liquid paraffin conversion. A catalyst analogous to that described in Example 1 was oxidized at 500° C. in the absence of HCl (sample 3A) and in the presence of HCl (3B) then subsequently reduced with hydrogen at 500° C. for 1.5 hours to afford the catalyst as used. The activity of the foregoing catalysts was referenced to that of a like catalyst which had not, however, been subjected to the 500° C. oxidation. All catalysts were tested in a fixed bed reactor at 50 psig and 495° C. using as a feedstock a mixture of iso and normal $C_6$ and $C_7$ paraffins at a LHSV of 5, with a once-through hydrogen flow at a 5:1 hydrogen:oil molar ratio. Conversion was determined as $$\frac{(\text{grams } C_5^- \text{ and aromatic in product}) - (\text{grams } C_5^- \text{ and aromatic in feed})}{\text{grams feed}}$$

where $C_5^-$ refers to hydrocarbons containing 1–5 carbon atoms. Data are summarized in Table 3, which clearly shows that catalyst subjected to thermal oxidation in the presence of a chloride source is comparable in performance to virgin catalyst, whereas catalyst oxidized in the absence of a chloride source performed quite poorly. As Table 3 clearly shows, the catalyst oxidized at 500° C. in the absence of HCl shows very poor conversion and stability. That oxidized in the presence of HCl shows somewhat lower activity than the reference catalyst but catalyst stability seems unimpaired.

TABLE 3

Comparison of Catalytic Performance in Liquid Paraffin Conversion

| Hours | % Conversion | | |
|---|---|---|---|
| | Sample 3A | Sample 3B | Virgin Catalyst |
| 5 | 46.5 | | 51 |
| 6 | | 56 | |
| 10 | 41 | 53.5 | 60.5 |
| 15 | 37 | 53.0 | 62.5 |
| 20 | 34.5 | 53.0 | 61 |
| 25 | 32.5 | 52.0 | |
| 30 | 30.5 | | 59 |
| 33 | | 52.0 | |
| 35 | 29 | | 58 |
| 36 | | 51.0 | |
| 40 | | | 57 |
| 44 | | 49.5 | |
| 45 | | | 56 |
| 50 | | 49.0 | 54 |
| 55 | | 48.5 | 54 |
| 60 | | | 53 |
| 65 | | 47.0 | 51.8 |
| 70 | | 46.5 | 51.8 |
| 74 | | 46.0 | |
| 75 | | | 50.4 |
| 80 | | 45.0 | 50 |
| 85 | | 45.0 | 48.2 |
| 90 | | 45.0 | 48 |
| 95 | | 43.5 | 47 |
| 100 | | 43.0 | 46.4 |
| 105 | | 42.5 | 46 |
| 110 | | 42.0 | 45 |
| 115 | | 41.8 | 44.20 |
| 120 | | 41 | 44 |
| 125 | | 40.7 | 43.2 |
| 130 | | | 40.5 |
| 135 | | 40.0 | 42 |
| 140 | | | 40.5 |
| 145 | | 39.0 | 40 |
| 150 | | 39.0 | 40 |
| 155 | | 38.2 | 40 |
| 160 | | 37.7 | 38 |
| 165 | | 36.8 | 38 |

EXAMPLE 4

Oxidation at 350° C. in the presence and absence of HCl. A catalyst like that of Example 1 was oxidized at 350° C. both in the presence of HCl and in its absence. Both samples were subsequently reduced in hydrogen at 350° C. for 1.5 hours to afford catalysts which were tested for their performance in liquid paraffin conversion. The results clearly showed that the catalyst oxidized in HCL is more stable than the fresh reference catalyst. The implication is that even at 350° C. platinum migration from the molecular sieve particles to the binder particles occur.

EXAMPLE 5

Effect of HBr during oxidation. A catalyst similar to that of Example 1 was oxidized at 500° C. in the presence of hydrogen bromide as a substitute for hydrogen chloride. The catalyst was subsequently reduced as previously described and then tested for its performance in a microreactor. The microreactor test results showed that injection of hydrogen bromide afforded a catalyst with characteristics similar to that resulting from oxidation in the absence of any halogen (low conversion and selectivity), whereas high catalyst activity and selectivity was effected by injection of hydrogen chloride. This result shows that all halogens are not equally effective in preventing group VIII metal migration from molecular sieve particles to binder particles at high temperatures in a non-reducing atmosphere.

What is claimed is:

1. A method of inhibiting the migration of a Group VIII metal from a molecular sieve particle to a binder particle in a carbonaceous deposit-free molecular sieve agglomerate comprising molecular sieve particles dispersed in a binder, said molecular sieve particles having deposited thereon at least one Group VIII zerovalent metal, where said migration occurs in a non-reducing atmosphere at a temperature greater than about 350° C. up to about 650° C. comprising adding to said atmosphere an effective amount of an anti-migratory agent which is chlorine, hydrogen chloride, or a chlorine-containing precursor of either chlorine or hydrogen chloride, or any combination of them.

2. The method of claim 1 where the molecular sieve particles are selected from the group consisting of silicalite, aluminophosphates, silica-aluminophosphates, transition metal-containing silica-aluminophosphates, zeolite X, zeolite Y, LZ-210, zeolite A, zeolite F, zeolite L, zeolite P, zeolite Q, zeolite W, clinoptilolite, mordenite, chabazite, errionite, ZSM-type zeolites, NU-type zeolites, faujasite, and phillipsite.

3. The method of claim 2 where the molecular sieve is a nonacidic molecular sieve.

4. The method of claim 1 where the binder is selected from the group consisting of silicas, aluminas, silica-aluminas, titania, silica-zirconia, silica-magnesia, alumina-bona, alumina-titania, clay, and mixtures thereof or any combination thereof.

5. The method of claim 4 where the binder is alumina or any combination containing alumina.

6. The method of claim 1 where the anti-migratory agent is a chlorine-containing compound which is hydrogen chloride or an alkyl chloride.

7. The method of claim 6 where the anti-migratory agent is hydrogen chloride.

8. The method of claim 1 where the anti-migratory agent is present in the non-reducing atmosphere at a concentration of at least 0.005 mole percent, but not greater than 5 mole percent.

9. The method of claim 1 where the anti-migratory agent is present in the non-reducing atmosphere at a concentration between about 0.1 and about 1 mole percent.

* * * * *